United States Patent [19]

Moriguchi et al.

[11] Patent Number: 4,536,550
[45] Date of Patent: Aug. 20, 1985

[54] POLYETHYLENE COMPOSITION

[75] Inventors: Kisoo Moriguchi; Tadashi Ikegami, both of Kurashiki, Japan

[73] Assignee: Asahi Kasei Kogyo Kabushiki Kaisha, Osaka, Japan

[21] Appl. No.: 599,401

[22] Filed: Apr. 12, 1984

[30] Foreign Application Priority Data

Apr. 21, 1983 [JP] Japan ............................. 58-69195
Apr. 21, 1983 [JP] Japan ............................. 58-69196
Aug. 9, 1983 [JP] Japan ............................. 58-144385
Aug. 9, 1983 [JP] Japan ............................. 58-144386

[51] Int. Cl.$^3$ ............................................. C08L 23/06
[52] U.S. Cl. ................................. 525/240; 526/352
[58] Field of Search ..................................... 525/240

[56] References Cited

U.S. PATENT DOCUMENTS 3,127,370  3/1964  Head ................................... 525/240
4,230,831 10/1980  Sakurai et al. ...................... 525/240
4,336,352  6/1982  Sakurai et al. ...................... 525/240

FOREIGN PATENT DOCUMENTS 52-3677    1/1976  Japan .
51-97687   8/1976  Japan .
51-107384  9/1976  Japan .
51-148785 12/1976  Japan .

OTHER PUBLICATIONS

Japanese Laid-Open Patent Publication 841/1981.
Translation—Journal of Society of Rheology of Japan, vol. 8, pp. 154–160, (1980), (Characterization of Low--Density Polyethylenes and Relationships Among Melt Index, Density, and Molecular Structural Parameters by Minoru Rokudai et al.).

Primary Examiner—Carman J. Seccuro
Attorney, Agent, or Firm—Sprung Horn Kramer & Woods

[57] ABSTRACT

A polyethylene composition comprising three specific types of polyethylenes; polyethylene (A), polyethylene (B) and polyethylene (C) respectively. The polyethylene composition has a melt index not less than 0.001 g/10 min. and not more than 10 g/cm and exhibits excellent processability under variant molding techniques. Molded objects exhibit excellent physical properties such as impact strength environmental stress cracking resistance and uniform thickness distribution. Polyethylene (A) has a molecular weight of from 5,000 to 90,000 and polyethylene (C) has a molecular weight of from 100,000 to 1,500,000 and the ratio of the molecular weight of polyethylene (C)/the molecular weight of polyethylene (A) is from 4 to 200. Polyethylene (B) has a molecular weight of from 50,000 to 500,000, being prepared by a polymerization with use of a chromium compound-supported type catalyst capable of producing a specifically conditioned homopolyethylene with respect to the properties of the polymers in terms of flow ratio and die swell.

8 Claims, 1 Drawing Figure

FIGURE
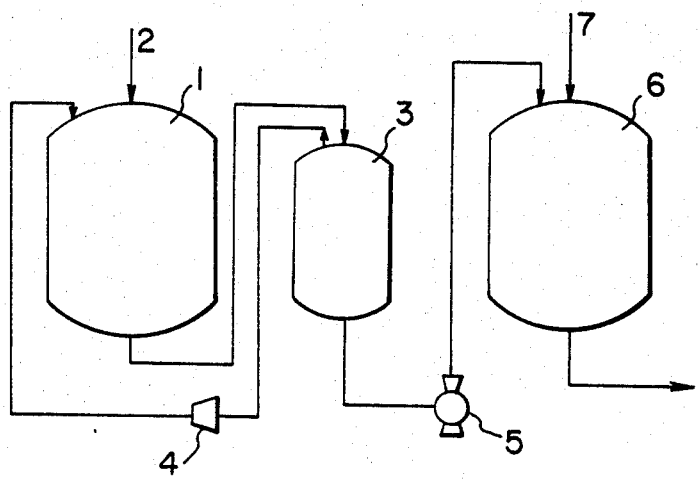

4,536,550

POLYETHYLENE COMPOSITION

BACKGROUND OF THE INVENTION

1. Field of the Invention

This invention relates to a polyethylene composition having excellent physical and chemical properties, and excellent moldability. More particularly, it relates to a polyethylene composition which exhibits excellent processability as well as excellent properties such as high impact resistance, high environmental stress cracking resistance (hereinafter referred to as ESCR) and the like in the application of various molding techniques such as blow molding, extrusion molding, injection-blow molding and the like.

2. Description of the Prior Art

In molding by blow molding, extrusion molding, injection-blow molding or the like, polyethylene having relatively high molecular weight as well as relatively broad molecular weight distribution is suitable. Several processes have been proposed in the art for preparation of polyethylenes with broader molecular weight distributions.

One of the known processes comprises mixing a high molecular weight polyethylene and a low molecular weight polyethylene. Examples are described in Japanese Patent Publication No. 3215/1970, Japanese Patent Publication No. 22007/1970, Japanese Laid-open Patent Publication No. 100444/1979, Japanese Laid-open Patent Publication No. 100445/1979, Japanese Laid-open Patent Publication No. 161657/1979, Japanese Laid-open Patent Publication No. 60542/1980, Japanese Laid-open Patent Publication No. 60543/1980, Japanese Laid-open Patent Publication No. 57841/1981, and Japanese Laid-open Patent Publication No. 133136/1982. Another known process is a multistage polymerization process in which two or more stages of polymerization are involved. Examples of this latter mode of preparation are described in Great Britain Patent Publication Nos. 1,174,542 and 1,233,599, U.S. Pat. Nos. 4,113,440 and 4,098,974 and Japanese Laid-open Patent Publication No. 47079/1976. The polyethylenes prepared by these known processes have wide molecular weight distributions and produce moldings having a good ESCR.

The present inventors have found that although the prior polyethylenes have broad molecular distributions and improved ESCR, they exhibit a number of drawbacks with regard to practical characteristics required for both molding and molded shaped products. The drawbacks encountered in the prior polyethylenes are low impact strength, poor viscoelastic characteristics on melting during molding, and susceptibility to generation of thickness irregularity. In addition to these drawbacks, prior polyethylenes encounter failures in producing moldings with complicated shapes.

SUMMARY OF THE PRESENT INVENTION

It is an object of the present invention to minimize the aforesaid drawbacks of the prior polyethylene compositions, and provide an improved polyethylene composition excellent in overall characteristics including both physical properties and processability. Specifically, the present invention provides a polyethylene composition comprising three types of polyethylenes (A), (B) and (C) selected from the group of homopolymers of ethylene and copolymers of ethylene and an α-olefin, wherein (i) polyethylene (A) has a molecular weight of from 5,000 to 90,000 (hereinafter referred to $MW_A$) and polyethylene (C) has a molecular weight of from 100,000 to 1,500,000 (hereinafter referred to $MW_C$), and the ratio of $MW_C/MW_A$ is between 4 and 200, (ii) polyethylene (B) has a molecular weight of from 50,000 to 500,000 (hereinafter referred to $MW_B$) produced by a polymerization using a chromium compound supported type catalyst which is capable of producing a homopolymer of ethylene in a single stage polymerization, having a flow ratio of from 40 to 150 and a die swell of from 40 to 100g/20cm measured at the condition in which the said homopolymer exhibits a melt index of 1 g/10 min., (iii) the ratio of polyethylene (A) to polyethylene (C) by weight is from 70 to 30 to 30 to 70, and the amount of polyethylene (B) in the composition ranges from 10% by weight to 75% by weight.

According to the present invention, there is provided a polyethylene composition which is featured by excellence both in physical properties such as impact resistance, ESCR, stiffness and resistivity to heat and in processability. With these excellent properties in combination, the polyethylene of the present invention is suited to wide varieties of commercial molding applications such as blow, extrusion, injection-blow and the like.

In the polyethylene composition of the present invention, polyethylene (A) and polyethylene (C) together can be regarded as one unit component.

The unit component can be a blend of polyethylene (A) with polyethylene (C) in which the respective polyethylenes are separately prepared, or a polyethylene composition obtained by a two stage polymerization process.

The unit component has a melt index of from 10 g/10 min. to 0.001 g/10 min., a flow ratio of from 20 to 500, a density of from 0.91 g/cm³ to 0.98 g/cm³ and die swell of from 20 to 50 g/20 cm.

BRIEF DESCRIPTION OF THE DRAWING

The foregoing and other features and advantages of the present invention will be apparent to those skilled in the art from the following detailed description taken in connection with the accompanying drawing.

The FIGURE is a flow sheet showing diagramatically a two stage polymerization process for preparation of polyethylene.

DETAILED DESCRIPTION OF THE INVENTION

The present invention will now be described in detail. The polyethylenes (A), (B) and (C), the components of the polyethylene composition of the present invention, are selected from the group consisting of homopolymers of ethylene and copolymers of ethylene and an α-olefin. Copolymerizable α-olefins are those having 3 to 14 carbon atoms such as propylene, butene, pentene, hexene, 4-methylpentene-1, octene decene and the like. The molecular weight of the polyethylene (A) ($MW_A$) is 5,000 to 90,000. $MW_A$ less than 5,000 lowers uniform dispersibility of all the components in the composition and the physical properties of the composition, whereas $MW_A$ exceeding 90,000 makes it difficult to broaden the molecular weight distribution of the composition within an appropriate range of the molecular weight and lowers the processability of the composition. Preferred $MW_A$ is 10,000 to 70,000. More preferably, the polyethylene (A) has a relatively narrow molecular weight distribution and a relatively small die swell value. Such a polyethylene is preferably produced by a magnesium-containing Ziegler type catalyst which is capable of producing a homopolymer of ethylene in a single stage polymerization having a flow ratio of 20 to less than 50 and a die swell of 20 g/20 cm to less than 50 g/20 cm measured at the condition in which the said homopolymer exhibits a melt index of 1 g/10 min. The polyethylene (C) has a molecular weight from 100,000 to 1,500,000 ($MW_C$). $MW_C$ less than 100,000 lowers both the molecular weight of the whole composition and ESCR. $MW_C$ more than 1,500,000 may lower uniformity of dispersibility of the component polyethylenes in the composition, making the composition unbalanced in both processability and physical properties or generating of fish-eyes in molding. Preferred $MW_C$ is between 200,000 and 1,000,000. More preferably, the polyethylene (C) has a relatively narrow molecular weight distribution as well as a relatively smaller die swell value. Such polyethylene has a molecular weight of from 200,000 to 1,000,000, and is preferably prepared by a magnesium-containing Ziegler type catalyst capable of producing a homopolymer of ethylene in a single stage polymerization having a flow ratio of 20 to less than 50 and a die swell of 20 g/20 cm to less than 50 g/20 cm measured at the condition in which the said homopolymer exhibits a melt index of 1 g/10 min.

The molecular weight of the polyethylene (B) is 50,000 to 500,000 ($MW_B$). The polyethylene (B) is produced by polymerization using a chromium compound supported type catalyst which is capable of producing a homopolymer of ethylene in a single stage polymerization having a flow ratio of from 40 to 150 and a die swell of from 40 g/20 cm to 100 g/20 cm measured at the condition in which the said homopolymer exhibits a melt index of 1 g/10 min.

A more preferable $MW_B$ is from 70,000 to 400,000 prepared by polymerization using a chromium compound supported type catalyst capable of producing a homopolymer of ethylene in a single stage polymerization having a flow ratio of from 50 to 120 and having a die swell of from 50 g/20 cm to 80 g/20 cm measured at the condition in which the said homopolymer exhibits a melt index of 1 g/10 min.

By a homopolymer of ethylene produced in a single stage polymerization there is meant a homopolyethylene prepared by a known single stage polymerization using a transition metal type catalyst at a fixed condition with respect to polymerization vessel, temperature, pressure, catalyst, molecular weight regulator and other polymerization conditions known in the art. Accordingly, the homopolyethylene produced in a single stage polymerization does not include any mixture of homopolyethylene prepared by different conditions, nor includes any homopolyethylene prepared by a two or more stage polymerization.

The density of the polyethylene (A) is from 0.91 g/cm$^3$ to 0.98 g/cm$^3$. The density of the polyethylene (B) is from 0.91 to 0.98 g/cm$^3$, preferably from 0.94 g/cm$^3$ to 0.97 g/cm$^3$. The density of the polyethylene (C) is from 0.91 g/cm$^3$ to 0.97 g/cm$^3$, preferably in a range from 0.91 g/cm$^3$ to 0.95 g/cm$^3$ and smaller than the densities of the polyethylenes (A) and (B), whereby the polyethylene composition is simultaneously improved in moldability and properties such as impact resistance, ESCR and the like.

In the present invention, $MW_C/MW_A$ ranges from 4 to 200. A ratio of $MW_C/MW_A$ less than 4 effects a narrow molecular weight distribution in the final composition leading to both poor processability and lowered ESCR. On the other hand a ratio exceeding 200 does not produce any meritorious improvement in moldability and physical properties, and results in disadvantage with regard to commercial production of the composition. A preferred range of $MW_C/MW_A$ is from 6 to 150 and the most preferable range is from 7 to 100. As hereinbefore stated, the molecular weight of the polyethylene (B) ($MW_B$) ranges from 50,000 to 500,000 preferably from 70,000 to 400,000. In the most preferred mode of the composition of the present invention, $MW_B/MW_A$ is more than 1.2, $MW_B/MW_C$ less than 0.9 and $MW_B$ is lower than the combined molecular weight of the bicomponent composition consisting of polyethylene (A) and polyethylene (C) ($MW_{A+C}$).

The ratio of the polyethylene (A) to the polyethylene (C) by weight ranges from 70:30 to 30:70, more preferably from 60:40 to 40:60. If the amount of the polyethylene (A) to the amount of the polyethylene (C) exceeds 70 or is less than 30, processability as well as ESCR will be lowered so that the utility properties of the composition will be unbalanced.

The amount of polyethylene (B) in the composition of the present invention is in a range of from 10% to 75% by weight, preferably from 15% to 60% by weight.

An amount of the polyethylene (B) less than 10% tends to produce faults such as lessened processability, and low impact strength. On the other hand, more than 70% of the polyethylene (B) in the composition lessens the ESCR.

The process for preparation of the polyethylene (A) and the polyethylene (C) will now be described. The polyethylene (A) and (C) are prepared by suspension polymerization, solution polymerization, gas phase polymerization, and the like using a transition metal type catalyst. Of the catalyst applicable, a magnesium-containing Ziegler type catalyst is preferred. A magnesium-containing Ziegler type catalyst produce a linear polyethylene containing minimal amounts of unsaturated bonds such as double bond and long side chains and having a dense and stable crystalline structure. The magnesium-containing Ziegler type catalyst can be made from any type of magnesium compounds such as inorganic magnesium compounds and organomagnesium compounds.

Examples of magnesium compounds are magnesium chloride, hydroxy-magnesium chloride, magnesium oxide, magnesium hydroxide, magnesium carbonate, magnesium alkoxides, organic acid salts of magnesium or complexes thereof with electron donor compounds such as alcohols, esters of carboxylic acids and the like or mixtures thereof, organomagnesium compounds having carbon-magnesium bond, for instance, dialkyl magnesium, alkyl magnesium chloride, alkylmagnesium alkoxides, alkyl magnesium siloxides or complexes thereof with electron donor compounds such as ethers and the like, a reaction product of the aforesaid organomagnesium compounds and a halogenated compound, for instance, hydrochloric acid, organic chlorides, chlorosilanes, silicon tetrachloride and tin tetrachloride.

The magnesium-containing Ziegler type catalyst comprises an organometallic compound and a reaction product of the above mentioned magnesium source and a titanium and/or vanadium compound. For preparation of polyethylene having a desirable flow ratio as well as a desirable die swell as already described, a specifically preferred catalyst system comprises a solid catalyst component (a) and organometallic compound (b).

The solid catalyst component (a) is prepared by reacting compound (I) with compound (II) or by reacting compounds (I), (II) and (III). The compound (I) is an organomagnesium compound represented by the general formula $M_\alpha Mg_\beta R^1_p R^2_q X_r Y_s$, wherein $\alpha$ is zero or a number more than zero; p, q, r, s, m, and $\alpha$, $\beta$ have the relation of $p+q+r+s=m\alpha+2\beta$, M represents an atom of metal element belonging to group I through group III in the Periodic Table, $R^1$ and $R^2$ are hydrocarbon radicals having the same or different numbers of carbon atoms, X and Y represents the same or a different radical selected from the group consisting of halogen, $OR^3$, $OSiR^4R^5R^6$, $NR^7R^8$ and $SR^9$ wherein $R^3$, $R^4$, $R^5$, $R^6$, $R^7$ and $R^8$ stand for a hydrogen atom or hydrocarbon radical and $R^9$ is a hydrocarbon radical. The compound (II) is a titanium compound containing at least one halogen atom, or a vanadium compound containing at least one halogen atom. The compound (III) is a halide of aluminum, boron, silicon, germanium, tin, terilium and/or antimony.

The organometallic compound (b) is a compound of an element selected from group I to III in the Periodic Table, a preferred compound of which is an organoaluminum compound or a complex containing organomagnesium compound.

The reaction of a solid catalyst component (a) with an organometallic compound (b) can be carried out by adding the components to a polymerization system so that they react while the polymerization proceeds. The reaction can also be carried out prior to polymerization. A preferred amount of the component (b) by weight to 1 g of solid catalyst component (a) ranges from 1 mmol to 3,000 mmol. A titanium compound supported on an inorganic magnesium compound may be used instead of a solid catalyst component (a). Among the catalyst systems hereinbefore mentioned, a high activity catalyst system which does not have to be removed from as-polymerized polymer is particularly preferable, and is referred to in Japanese Patent Publication Nos. 36788/1977, 36790/1977, 36791/1977, 36792/1977, 50070/1977, 36794/1977, 36795/1977, 36796/1977, 36915/1977, 36917/1977, 6019/1978, and Japanese Laid-open Publication Nos. 97687/1976, 107384/1976, 148785/1976, 3677/1977 and 40696/1978.

Polyethylenes (A) and (C), both of which are separately prepared, can be blended in formulating the polyethylene composition. For a commercial preparation of the polyethylene composition of the present invention, it is preferred that a polyethylene consisting of the two components is prepared by a two stage polymerization. Although any known two stage polymerization can be employed, the following process is an especially preferred two stage polymerization for preparation of the polyethylenes(A) and (C). In the preferred process, polymerization is carried out in the presence of saturated hydrocarbon having 4 to 10 carbon atoms.

The order of preparing the respective polyethylene component is not critical in a two stage polymerization; polymerization of the polyethylene (A) can precede that of the polyethylene (C), or vice versa. Referring to the Figure, there is shown a preparation of the bicomponent polyethylene by means of a two stage polymerization in which polymerization of the polyethylene (A) precedes the polymerization of the polyethylene (C). The polyethylene (A) of the lower molecular weight component is first prepared under a polymerization pressure of from 1 to 30 kg/cm$^2$G, preferably from 3 to 25 kg/cm$^2$G at a polymerization temperature from 60° C. to 100° C., preferably 70° C. to 90° C. The polyethylene (C), which is the higher molecular weight component, is then produced under a polymerization pressure of from 0.5 to 30 kg/cm$^2$G, preferably from 0.5 to 20kg/cm$^2$G at a polymerization temperature between 40° C. and 110° C., preferably between 60° C. and 90° C.

Through a line (2), ethylene, hexane, hydrogen and catalyst are fed into a polymerization vessel (1), where the lower molecular weight polyethylene (A) is produced by polymerization. A slurry in the polymerization vessel (1) is introduced into a flush drum (3), where unreacted ethylene and hydrogen are removed. The removed ethylene and hydrogen are pressurized in a compressor (4) and returned to the polymerization vessel (1). On the other hand, the slurry in the flush drum (3) is introduced into the second stage polymerization vessel (6) by means of a pump (5). Ethylene, comonomer, hexane and catalyst components are fed through a line (7) into the polymerization vessel (6), where the high molecular weight polyethylene (C) is produced by polymerization, and the polymer in the polymerization vessel (6) is withdrawn through a post-treatment step (not shown) as a product.

The flow of the foregoing process is one representative example employable in the preparation of a polyethylene component consisting of polyethylene (A) and polyethylene (C). In another case, the polyethylene (C) of the higher molecular weight component may be produced by polymerization in the polymerization vessel (1) and the polyethylene (A) of the lower molecular weight component may be produced by polymerization in the polymerization vessel (6). In the latter case, the flush drum (3) can be omitted. The contents of the latter stage polymerization vessel (6) may be recycled to the preceding stage polymerization vessel (1). Accordingly, the polyethylene (A) and polyethylene (C) can be continuously prepared by using a two stage polymerization.

The polyethylene (B) is prepared by a polymerization using a chromium compound supported type catalyst. A polyethylene prepared by using a chromium compound supported type catalyst contains a relatively larger amount of unsaturated bond such as double bond, and differs in chain branching structure as well as crystalline structure from a polyethylene prepared by using a magnesium-containing Ziegler type catalyst. Examples of catalyst capable of producing a homopolyethylene having a flow ratio (hereinafter referred to as MIR) of from 40 to 150 and a die swell of from 40 g/20 cm to 100 g/20 cm measured at the condition in which the said homopolymer exhibits a melt index of 1 g/10 min. are a chromium compound supported on inorganic oxide (c) and such supported chromium compound (c) combined with an organometallic compound (d). As inorganic oxide support for supported catalyst of chromium compound, silica, alumina, silica-alumina, zirconia, thoria and the like, may be used. Silica and silica-alumina are preferred inorganic oxide type support. A specifically preferred support is commercially available silica having a high surface area and high porosity.

The chromium compounds include chromium oxides, chromium compounds capable of at least partially forming chromium oxides, when calcined, such as halides of chromium, oxihalides of chromium, nitrates of chromium, acetates of chromium, chromium sulfates, chromium oxalates, alcoholates of chromium and the like.

Examples of these chromium compounds are chromium trioxide, chromyl chloride, potassium dichromate, ammonium chromate, chromium nitrate, chromium acetate, chromium acetylacetonate, tert-butyl chromate and the like. Of these, chromium trioxide, chromium acetate and chromium acetylacetonate are especially preferred.

The chromium compound is supported by known methods such as impregnation, solvent evaporation and sublimation.

In general, the supporting method to be employed may depend on the kind of chromium compound used. It can be an either aqueous or non-aqueous technique.

For example, in the case of using chromium oxides, water may be used. In the case of using acetylacetonate, non-aqueous solvent such as toluene may be used. The amount of chromium on the support is in the range of from 0.05% to 5%, preferably from 0.1% to 3%, by weight.

The calcination is generally carried out in a non-reducing atmosphere, for instance, in the presence of oxygen. But it can also be conducted in the presence of an inert gas or under a reduced pressure. Preferably calcination is conducted in air substantially free of moisture. Calcination is conducted at a temperature not lower than 300° C., preferably at a temperature from 400° C. to 900° C., for several minutes to about several 10 hours, preferably for 30 minutes to 10 hours. It is recommended that the calcination should be performed in a fluidized state by flowing sufficient dry air.

Of course, it is possible to control the activity of a catalyst and the molecular weight, etc. of a polyethylene by adding a titanate or a fluorine-containing salts or the like during supporting or calcining.

Further, a catalyst prepared by supporting a compound such as silyl chromate or a reaction product of amine and chromium trioxide and a compound described below:

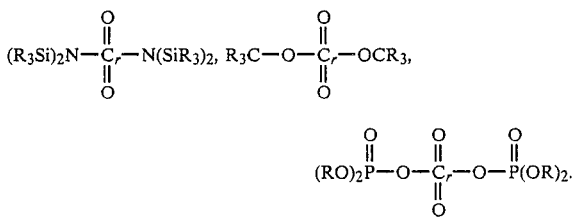

On the aforesaid support can be used. These catalysts are described in U.S. Pat. Nos. 2,825,721; 2,951,816; 3,130,188; 3,324,095; 3,709,853; 3,493,554; 3,474,080, EP-A-0067068 and Japanese Laid-open Patent Publication No. 5308/1983.

In the above formulae, R represents a hydrocarbon group.

The supported catalyst of chromium compound combined with organometallic compound comprises a combination of an organometallic compound (d) and solid component (c) obtained by supporting a chromium compound on an inorganic oxide.

As an inorganic oxide support, the inorganic oxides as explained already in the preparation of a supported catalyst of chromium compound can be used.

The following are organometallic compounds (d) to be used in combination with a supported chromium compound (c).

(1) Organic magnesium complex soluble in an inert hydrocarbon which is represented by $Al_\alpha Mg_\beta R^1_p R^2_q R^3_r X_s Y_t$, wherein $\alpha$ and $\beta$ are a number more than 0, p, q, r, s and t are 0 or a number more than 0 and they have the relation of $0<(s+t)/(\alpha 30 \beta)\leq 1.5$ and $p+q+r+s+t=3\alpha+2\beta$, $R^1$, $R^2$ and $R^3$ are the same or different hydrocarbon groups having 1 to 20 carbon atoms, X and Y represent the same or different groups selected from $OR^4$, $OSiR^5R^6R^7$, $NR^8R^9$ and $SR^{10}$, $R^4$, $R^5$, $R^6$, $R^7$, $R^8$ and $R^9$ represent hydrogen or a hydrocarbon group respectively, and $R^{10}$ represents a hydrocarbon group.

(2) Organomagnesium compounds soluble in an inert hydrocarbon that is represented by the general formula $MgR_u'R_v''X_xY_y$, wherein $R'$ and $R''$ represent hydrocarbon groups, and at least one of $R'$ and $R''$ is a secondary or tertiary alkyl group containing 4 to 6 carbon atoms, or $R'$ and $R''$ are alkyl groups differing in number of carbon atoms from each other, or at least one of $R'$ and $R''$ is a hydrocarbon group with six or more carbon atoms; X and Y are electro-negative groups with an O, N or S atom; u, v, x and y are 0 or a number more than 0 and they have the relation of $u+v+x+y=2$ and $0<x+y\leq 1.5$.

(3) Organomagnesium compounds soluble in an inert hydrocarbon represented by the general formula $M_\alpha Mg_\beta R^1_p R^2_q R^3_r X_s Y_t$, wherein $\alpha$ and $\beta$ represent numbers more than 0, p, q, r, s and t represent 0 or a number more than 0 and they have the relationship of $0\leq(s+t)/(\alpha+\beta)\leq 1.5$ and $p+q+r+s+t=m\alpha+2\beta$; M is an atom selected from zinc, boron, beryllium and lithium, m stands for the valence of M; $R^1$, $R^2$ and $R^3$ are the same or different hydrocarbon groups having 1 to 20 carbon atoms; X and Y stand for the same or different groups selected from $OR^4$, $OSiR^5R^6R^7$, $NR^8R^9$ and $SR^{10}$; $R^4$, $R^5$, $R^6$, $R^8$ and $R^9$ are hydrogen or a hydrocarbon group; and $R^{10}$ stands for a hydrocarbon group.

(4) Organomagnesium compounds represented by the general formula $M_\alpha Mg_\beta R^1_p R^2_q (OSiHR^3R^4)_r$, wherein M represents an atom selected from the group consisting of aluminum, zinc, boron and berylium; $R^1$, $R^2$ and $R^3$ are hydrocarbon groups having 1 to 20 carbon atoms; $R^4$ stands for hydrogen or a hydrocarbon group having 1 to 20 carbon atoms; $\alpha$, $\beta$ and $\gamma$ are a number exceeding 0; p and q are 0 or a number more than 0 and $p+q+r=m\alpha+2\beta$; and m is the valence of M.

(5) Organoaluminum compounds represented by the general formula $AlR^1_n(OSiHR^2R^3)_{3-n}$, wherein $R^1$ and $R^2$ are hydrocarbon groups with 1 to 20 carbon atoms; $R^3$ represents hydrogen or a hydrocarbon group with 1 to 20 carbon atoms; and n is a number from 1 to 3.

(6) Organoaluminum compounds having both alkoxy group and hydroxy group represented by the general formula $AlR^1_p H_q (OR^2)_x (OSiHR^3R^4)_y$, wherein the relations of $p\geq 1$, $1\geq q\geq 0$, $x\geq 0.25$, $y\geq 0.15$, $1.5\geq x+y\geq 0.5$ and $p+q+x+y=3$ are satisfied; $R^1$, $R^2$, $R^3$ and $R^4$ are the same or different hydrocarbon groups having from 1 to 20 carbon atoms.

(7) Organoaluminum compounds represented by the general formula $Al\,R_n X_{3-n}$, wherein R is a hydrocarbon group, X represents a halogen, $OR^1$ or $OSiR^2R^3R^4$ where $R^1$, $R^2$, $R^3$ and $R^4$ represent hydrocarbon; n is a number satisfying the relationship $1\leq n\leq 3$.

(8) Organozinc compound represented by the general formula $Zn_n R_m X_{2-m}$, wherein R is hydrocarbon group, X represents $OR^1$ where $R^1$ is a hydrocarbon group, and m is a number satisfying the relationship $1\leq m\leq 2$.

(9) Organolithium compounds represented by the general formula LiR, wherein R is a hydrocarbon group.

(10) Organoboron compounds represented by the general formula $BR_l X_{3-l}$, wherein R is a hydrocarbon group, X represents halogen or $OR^1$ or $OSiR^2R^3R^4$ where $R^1$, $R^3$ and $R^4$ are hydrocarbon groups, and $R^2$ stands for a hydrogen atom or a hydrocarbon group; l is a numeral defined as $1 \leq l \leq 3$.

The catalyst compositions mentioned above are described in U.S. Pat. Nos. 3,081,286; 3,476,724; 3,445,367; 4,376,720, EP-A-0067598, Japanese Laid-open Patent Publication Nos. 70108/1982; 70109/1982; 198706/1982; 200405/1982 and 209902/1982.

The polyethylene (B) prepared by using a chromium compound supported catalyst combined with organometallic compounds explained above is especially desirable, since single stage polymerization of ethylene produces a homopolyethylene having a MIR of 50 to 120 and a die swell of 50 to 80 g/20 cm measured at the condition in which the said homopolymer exhibits a melt index of 1g/10 min.

The polyethylene (B) can be prepared by suspension polymerization, solution polymerization, gas phase polymerization and the like using the chromium compound supported catalyst and such supported catalyst combined with said organometallic compounds.

Suspension polymerization is carried out by feeding monomeric olefin at a pressure of 1 to 50 kg/cm$^2$G to an already introduced polymerization solvent and catalyst in a polymerization vessel. The rate of the polymerization may be increased by keeping the temperature of the polymerization system at from 30° C. to 110° C. Examples of polymerization solvent are aliphatic hydrocarbons such as propane, butane, isobutane, pentane, isopentane, hexane and heptane, aromatic hydrocarbons such as benzene and toluene, and cycloaliphatic hydrocarbons such as cyclohexane and methylcyclohexane. A good powder state of low density copolymer of ethylene and α-olefin can be obtained by using a polymerization solvent having carbon not more than 4 carbon atoms.

Solution polymerization, generally carried out by feeding monomeric olefin under a pressure of from 1 to 400 Kg/cm$^2$G preferably from 10 to 250 Kg/cm$^2$G into an already introduced polymerization solvent mentioned above in the presence of a catalyst. The polymerization reaction proceeds at a temperature of 120° C. to 350° C., preferably at 150° C. to 320° C..

Gas phase polymerization is carried out by making monomeric olefin contact with catalyst at a temperature at 30° C. to 130° C. under a pressure from 1 to 50 Kg/cm$^2$.

In general, fluidized bed technique, moving bed technique or agitating means for mixing is adopted to obtain a good contact of monomeric olefin and catalyst in a polymerization reaction.

The polyethylene composition of the present invention is prepared by mixing the polyethylenes (A), (B) and (C). Method of mixing the polymers can be any conventionally used methods in the form of powder, slurry, pellet and so on.

When kneading is necessitated, it may be conducted at a temperature of 150° C. to 300° C. by using a single or twin-screw extruder, a kneader, or the like machine.

The polyethylene composition thus produced has a MI of from 0.001 to 10 g/10 min. and has a density of from 0.91 to 0.97 g/cm:, preferably from 0.935 to 0.965 g/cm$^3$. Its molecular weight distribution is not less than 60, preferably not less than 75 in terms of MIR.

The polyethylene composition for use in injection-blow molding should preferably have a MI of from 0.5 g/10 min. to 3 g/10 min. For use in blow or extrusion molding, the polyethylene composition should have a MI preferably of from 0.005 to 1 g/10 min., and most preferably of from 0.01 g/10 min. to 0.5 g/10 min.

The polyethylene composition of the present invention may contain the materials usually added to polyolefins such as thermal stabilizers, antioxidants, UV-ray absorbers, pigments, antistatic agents, lubricants, fillers, other polyolefins, thermoplastic resins, rubbers and so on, as the case may require.

It is also possible to perform foam-molding of the present composition with a foaming agent incorporated therein. Radical initiators and cross-linking agents can be incorporated in the polyethylene composition so as to effect cross-linking.

In the present specification, the respective characteristics of the polyethylene (A), (B) and (C) is represented by MIR and die swell value of a homopolyethylene produced in a single stage polymerization measured at the condition in which said homopolyethylene exhibits a melt index of 1 g/10 min. This is because both MIR value and die swell value are the parameters that represent directly the molecular structure of linear polyethylene prepared by a single stage polymerization. More directly, these parameters are essentially determined by the kind of catalyst used in polymerization. The characteristics of polyolefin in terms of molecular weight and amount of copolymerized α-olefin are determined by a molecular weight adjusting agent and the amount of copolymerized monomer which are used in polymerization. On the other hand, the characteristics pertaining to molecular structures, involving chain branching structure, the presence of unsaturated bonds, molecular distribution and the like are specifically determined according to the kind of catalyst used in polymerization, and can be represented by MIR as well as die swell.

The reason why the polyethylene composition according to the present invention is excellent in both processability and physical properties may be considered as described below. The low molecular weight polyethylene moiety having a narrow molecular weight distribution and a low melt elastic recovery effect (the polyethylene (A)) and the high molecular weight polyethylene moiety having a narrow molecular weight distribution and a low melt elastic recovery effect (the polyethylene (C)) are homogeneously mixed together with the polyethylene (B) which has an intermediate molecular weight, a relatively wide molecular weight distribution and an adequately high melt elastic recovery effect, whereby the molecules in the composition are entangled so as to effect an optimal mode of molecular structure.

The subsequent examples show the excellence of the polyethylene composition of the present invention. For instance, use of polyethylene having the same molecular weight as the polyethylene (B) and prepared by using a magnesium-containing Ziegler type catalyst in the polyethylene composition cannot produce an excellent characteristics in processability and physical properties as obtained by the composition of the present invention. As described in detail above, the specific features of the polyethylene composition obtained according to the present invention may be summarized as follows:

(1) The polyethylene composition is excellent in processability, since flow characteristics and viscoelastic characteristics are well balanced. In particular, good moldability of the composition in blow molding, extrusion molding of pipes, sheet and the like product, injection-blow molding or the like, gives little thickness irregularity or unevenness in molded products.

(2) The molded articles of the polyethylene composition have great stiffness, impact resistance, and ESCR. All of these characteristics exhibit good practical balance.

(3) Since the polyethylene composition is excellent in physical properties and processability, thin molded articles can easily be produced. Therefore, it meets the demand of the age for saving resources and energy.

(4) Molded articles with good appearance are obtained.

(5) The composition can be used for various shaping methods such as injection molding, film-making, stretching, rotoforming and foaming.

EXAMPLES

The following examples are given to illustrate the invention in more detail and should not be construed as limiting the scope of the present invention.

Designations, and methods and conditions for measurements described in the examples and comparative examples are summarized below:

(i) MI designates the melt index measured at a temperature of 190° C. under a load of 2.16 kg in accordance with ASTM D-1238.

(ii) MIR is defined as the quotient of the value measured under the condition of measurement of MI under a load of 21.6 kg divided by MI. MIR is a measure of molecular weight distribution. Value of MIR increases as the molecular weight distribution broadens.

(iii) Molecular weight (MW) was calculated from the intrinsic viscosity ($\eta$) measured in a solution of decalin at 135° C. and the equation $\eta = 6.8 \times 10^4 MW^{0.67}$ described in Journal of Polymer Science Vol. 36. P 91 (1957). All the molecular weights referred to in the present specification are based on this method.

(iv) Density was measured in accordance with ASTM D-1505.

(v) Impact strength means the notched Izod impact strength according to ASTM D-256.

(vi) ESCR designates environmental stress cracking resistance. A 2,000 ml volume bottle with a handle (95 grams) was molded by use of a 60 mm$\phi$ screw molding machine at a cylinder temperature of 190° C. and a mold temperature of 40° C. After 200 ml of an aqueous solution containing 33 % nonionic surfactant is charged in the bottle, the bottle is sealed with a stopper and placed in an oven at 60° C. The time until generation of cracks on the bottle is measured.

(vii) Impact resistance of a bottle was measured on a bottle molded according to the molding described above. The bottle is filled with cold water at 13° C. and sealed with a stopper. And it is repeatedly dropped from the hight of 1.9 m onto a concrete surface. The number of the repeated droppings before destruction of the bottle is counted.

(viii) Extrusion processability is expressed by the amount of a composition extruded through the Type A-50 blow molding machine manufactured by PLACO Co., Ltd. at a cylinder temperature of 190° C. operated at 46 rpm of screw rotation.

(ix) Die swell is defined as the weight of 20 cm parison when extruded by use of a die for blow molding with an outer diameter of 15 mm and an inner diameter of 10 mm under the operating conditions described in (viii). If no swelling phenomenon occurs, the weight of the parison will be about 15 grams.

(x) Thickness irregularity of the bottle molded in accordance with the molding deserbed in the above (vi) was reported. Particularly, the welded pinch-off portion of the handle which is prone to become thinner, was evaluated visually. Double circles mark ( ⓞ ) indicates an excellent state, circle mark (◎) indicates a good state, triangle mark (Δ) indicates a slightly bad state, and cross mark (+) indicates an extremely bad state.

Example 1-1

(1) Preparation of catalyst for polyethylene (A) and (C) Two liters of a hexane solution containing 1 mol/l of trichlorosilane (HSiC$_3$) were placed in an 8 liter autoclave and kept at 50° C. 2 liters of a hexane solution containing 1 mol/l of an organoaluminum-magnesium complex with a composition corresponding to Al Mg$_{6.0}$(C$_2$H$_5$)$_{2.0}$(n-C$_4$H$_9$)$_{9.5}$(OC$_4$H$_9$)$_{3.5}$ was added dropwise to the hexane solution of trichlorosilane under stirring over two hours. Then the mixture was reacted for a further two hours. The solid product so obtained was washed two times with 2 liters of fresh hexane by means of decantation. To the slurry containing the solid product was added 2 liters of titanium tetrachloride, and the reaction was carried out at 130° C. for two hours so that a solid catalyst component was formed. The solid catalyst component was then isolated and washed with fresh hexane until no free halogen was detected. This solid catalyst component (a) contained 2.1 % of titanium by weight.

(2) Preparation of a bicomponent composition consisting of polyethylenes(A) and (C) by two stage polymerization.

A two stage polymerization was conducted according to the process as shown in the Figure. First, polymerization for preparation of a low molecular weight polyethylene moiety (A) was carried out in a polymerization vessel (1) with an inner volume of 300 l. The polymerization temperature was 83° C. and the polymerization pressure was 11 kg/cm$^2$G.

Into the polymerization vessel (1) were fed the above solid catalyst component (a) at a rate of 1.3 mmol (Ti atom base)/hr., triethylaluminum as an organometallic compound (b) at a rate of 20 mmol (metallic atom base)/hr. and purified hexane at a rate of 40 liters/hr.

Ethylene was also fed at the rate of 7NM$^3$/hr. and hydrogen as a molecular weight regulator was fed so that the hydrogen concentration in the gas phase might become about 90 mol % to effect the first polymerization.

Secondly, in order to prepare a polyethylene (C) moiety, the polymer slurry obtained by the first polymerization in the polymerization vessel (1) was introduced into the flush drum (3) at a pressure of 1 kg/cm$^2$G and at a temperature of 75° C., where the unreacted ethylene and hydrogen were separated. Then the slurry was pressurized by the slurry pump (5) and introduced into the polymerization vessel (6) of an inner volume of 250 liters. The second polymerization was carried out in the polymerization vessel (6) at a temperature of 80° C. and a pressure of 8 kg/cm$^2$G. In the second polymerization triethylaluminum at a rate of 7.5 mmol (metallic atom base )/hr., purified hexane at 40 l/hr. and ethylene at the rate of 7.2 NM$^3$/hr. were fed into the polymerization vessel (6) and hydrogen and butene-1 were fed thereinto so that the concentration thereof in the gas phase might become about 2 mol % and about 2.5 mol % respectively to effect the second polymerization.

The polyethylene product in polymerization vessel (6) as prepared by the above two stage polymerization was obtained in the form of powder with an MI of 0.17g/10 min. and a density of 0.956 g/cm$^3$.

The polyethylene as obtained contained 49% by weight corresponding to polyethylene (A) produced in the first polymerization and 51% by weight corresponding to polyethylene (C) produced in the second polymerization according to the computation based on the actual amount of the polymer produced in the polymerization.

According to the results of the experiment of a single stage polymerization conducted separately in the same manner and conditions as the above, it was estimated that the low molecular weight moiety of the polyethylene (A) produced in the first stage polymerization vessel (1) has a molecular weight of about 13,000 and a density of about 0.974 g/cm$^3$ and that the high molecular weight moiety of the polyethylene (C) produced in the second polymerization vessel (2) has a molecular weight of about $54 \times 10^4$ and a density of 0.939 g/cm$^3$.

Accordingly, the ratio MWc/MWA of the bicomponent polyethylene prepared by the above two stage polymerization was estimated at 41.5. For reference, the homopolyethylene having a MI of 1.0 g/10 min. prepared by a single stage polymerization using the catalyst employed in the above polymerization has a MIR of 37 and a die swell of 38 g/20 cm.

(3) Preparation of a catalyst for producing polyethylene (B)

(i) Preparation of solid catalyst component (c)

Ten grams of chromium trioxide was dissolved in 2,000 ml of distilled water. 500 g of silica (product of Fusi Devison Co., Grade 952) was immersed in the solution and the slurry was stirred at room temperature for an hour. This slurry was heated to evaporate water, then the residue was dried under reduced pressure at 120° C. for ten hours. This solid was calcined in a stream of dry air at 700° C. over 5 hours to give a solid catalyst component (c). The solid catalyst component (c) was found to contain 1% by weight of chromium. It was stored in a nitrogen atmosphere at room temperature.

(ii) Preparation of organoaluminum component (d)

100 mmol of triethylaluminum, 50 mmol (based on silicon atom) of methylhydropolysiloxane (viscosity at 30° C. is 30 centistokes) and 150 ml of n-heptane were weighed and placed in an pressure resistant glass container under an atmosphere of nitrogen. The mixture was reacted at 100° C. over 24 hours under stirring by means of a magnetic stirrer to produce an n-heptane solution of $Al(C_2H_5)_{2.5}(OSi.H.CH_3.C_2H_5)_{0.5}$.

The 100 mmol (based on aluminum) of this n-heptane solution was weighed and placed in a 200 liter flask under nitrogen, and a mixture of 50 mmol of ethanol and 50 ml of n-heptane was added dropwise thereto with ice cooling, under stirring, from a dropping funnel. After the dropwise addition, the mixture was reacted for an hour to obtain a n-heptane solution of $Al(C_2H_5)_{2.0}(OC_2H_5)_{0.5}(OSi.H.CH_3.C_2H_5)_{9.5}$.

(4) Preparation of polyethylene (B)

A polyethylene (B) was prepared by a single stage polymerization using a polymerization vessel having an inner volume of 200 liters.

The polymerization was carried out at a temperature of 83° C. under a pressure of 11 kg/cm$^2$G, and the polymerization was controlled so as to produce the polymer at 10.5 kg/hr.

As a catalyst, the solid component (c) prepared in (3)-(i) at a rate of 3.1 g/hr. and organoaluminum component (b) produced in (3)-(ii) at a rate of 3 mmol/hr. were introduced together with purified grade of hexane furnished at a rate of 40 l/hr. The concentration of hydrogen as a molecular weight regulator was adjusted at 30 mol % of the total gas phase so that a polyethylene (B) with a molecular weight of about 110,000, a MIR of 58 and a density of 0.967 g/cm$^3$ was produced.

In addition to the above, it was found that the homopolyethylene having a MI of 1 g/10 min. prepared in a single stage polymerization using this catalyst has a MIR of 71 and a die swell of 64g/20 cm.

(5) Preparation of the polyethylene composition

The powder of the bicomponent polyethylene consisting of the polyethylenes(A) and (C) as prepared in the above described two stage polymerization and the polyethylene (B) as prepared above were mixed in a ratio of 60:40 by weight, and then, to this mixture, 300 ppm of tetrakis[methylene-3-(3',5'-di-t-butyl-4'-hydroxyphenylpropionate] methane and 300 ppm of dilauryl-3,3'-thiodipropionic acid ester as antioxidants were added. Then, the mixture was thoroughly mixed by stirring in a Henschel mixer. The mixture was kneaded at 220° C. in an FCM machine manufactured by Farrel Co. and then the kneaded product was extruded at 200° C. by a single-screw extruder to produce a polyethylene composition.

As seen from Table 1, the polyethylene composition was excellent both in processability and in physical properties.

Example 1-2 and 1-3

The polyethylenes (A), (B) and (C), all of which were prepared in Example 1-1, were blended in various ratios to produce several polyethylene compositions as tabulated in Table 1. The manners and conditions for the respective polyethylene compositions with respect to mixing, kneading, kinds of additives and amount thereof and extruding were the same as those employed in Example 1—1. The properties of these polyethylene compositions were evaluated. The results are shown in Table 1.

Comparative Example 1—1 and 1-2

The polyethylenes (A), (B) and (C), all of which were prepared in Example 1—1, were blended in various ratios to produce several comparative polyethylene compositions as tabulated in Table 1. For each comparative polyethylene composition except the combination ratio of the respective polyethylene component the manners and conditions of the blending kneading and extruding were the same as those in Example 1—1.

The properties of the comparative polyethylene compositions were evaluated. The results are shown in Table 1.

Comparative Example 1-3

The bicomponent polyethylene consisting of polyethylenes (A) and (C) as produced in Example 1—1 was pelletized in the same manner as in Example 1—1 with respect to the additives and condition of kneading, extrusion and so on, and the properties of the pelletized bicomponent polyethylene were evaluated. The results are shown in Table 1.

Comparative Example 1–4

The polyethylene (B) as prepared in Example 1—1 was pelletized in the same manner as in Example 1—1 with respect to the additives and the conditions of kneading, extrusion and so on, and the pelletized polyethylehe (B) was evaluated. The results are shown in Table 1.

(polyethylene (A)) and having a density of 0.950 g/cm$^3$, wherein the concentration of hydrogen was about 48 mol % and the concentration of butene-1 was about 7 mol %. The efficiency of the catalyst was 170,000 g polymer per 1 g of titanium.

In the preparation of the higher molecular polyethylene (polyethylene (C)), the gaseous phase composition in the polymerization vessel was adjusted so as to produce a polymer having a molecular weight (MW$_C$) of 280,000 and a density of 0.935 g/cm$^3$, where the concentration of hydrogen was about 10 mol % and that of butene-1 was about 6 mol %. The efficiency of the

TABLE 1

| | | | | | | | Properties of Polyethylene Compositions | | | | |
|---|---|---|---|---|---|---|---|---|---|---|---|
| | Component Polyethylene Being Mixed | | | | MI | | | Dropping Impact of Bottle | ESCR of | Extrusion | Die Swell | Irregularity Thickness |
| | MW$_C$/ | Parts by weight | | | (g/10 | | Density | Izod Impact Strength | (number of | Bottle | rate | (g/20 | of Bottle |
| Item | MW$_A$ | (A) | (B) | (C) | min) | MIR | (g/cm$^3$) | (Kg cm/cm) | droppings) | (hour) | (g/min) | cm) | (rank) |
| Example 1-1 | 41.5 | 29.4 | 40 | 30.6 | 0.20 | 154 | 0.960 | 23 | 12 | 83 | 245 | 44.9 | ⊙ |
| Example 1-2 | 41.5 | 39.2 | 20 | 40.8 | 0.14 | 188 | 0.958 | 19 | 8 | 91 | 238 | 40.3 | ⊙ |
| Example 1-3 | 41.5 | 19.6 | 60 | 20.4 | 0.29 | 130 | 0.962 | 25 | 10 | 65 | 247 | 48.5 | ⊙ |
| Comparative Example 1-1 | 41.5 | 46.1 | 6 | 47.9 | 0.12 | 210 | 0.957 | 15 | 1 | 42* | 223 | 35.9 | x |
| Comparative Example 1-2 | 41.5 | 9.8 | 80 | 10.2 | 0.45 | 93 | 0.964 | 27 | 5 | 15 | 252 | 52.1 | ⊙ |
| Comparative Example 1-3 | 41.5 | 49 | 0 | 51 | 0.11 | 218 | 0.956 | 14 | 1 | 25 | 218 | 34.8 | x |
| Comparative | — | 0 | 100 | 0 | 0.71 | 65 | 0.966 | 29 | 6 | 3 | 255 | 62.3 | ⊙ |

*Cracks occurred in the vicinity of the welded pinch-off portion of the handle of the bottle. In others, cracks occurred at the bottom portion of the bottle.

Example 2-1

(1) Preparation of catalyst for producing both polyethylene (A) and (C).

138 g of di n-butylmagnesium, 19 g of triethylaluminum and 2 liters of n-heptane were fed into a stirring tank of 4 liters. The mixture was reacted at 80° C. for 2 hours to synthesize an organoaluminum-magnesium-complex having the composition AlMg$_6$(C$_2$H$_5$)$_3$(n-C$_4$H$_9$)$_{12}$.

After the removal of water and oxygen by means of replacement of dried nitrogen, 800 ml of the n-heptane solution containing 400 mmol (54 g) of the organoaluminum-magnesium complex and 800 ml of n-heptane solution containing 400 mmol of titanium tetrachloride were reacted at −20° C. under stirring for 4 hours. The formed solid insoluble in a hydrocarbon was isolated and washed with fresh n-heptane to give 106 g of a solid catalyst component (a).

(2) Preparation of polyethylene (A) and polyethylene (C)

As polyethylene components for preparation of polyethylene compositions, polyethylenes (A) and (C) were prepared by the following processes and conditions using the above catalyst in the polymerization vessel used for the preparation of the polyethylene (B) described in Example 1—1. The polymerization were carried out at 86° C. under a polymerization pressure of 12 kg/cm$^2$G. Triethylaluminum (b) and the solid catalyst component (a) were fed together with hexane which was fed at a rate of 30 l/hr. into the polymerization vessel. Triethylaluminum (b) was kept at 15 mmol/hr. in the vessel and the feeding rate of the solid catalyst component (a) was kept so that a polyethylene produced at a rate of 8 kg/hr. Hydrogen was also fed as a molecular weight regulator.

Butene-1 was used as a comonomer. The gaseous composition in the polymerization was adjusted so as to produce a low molecular weight (MW$_A$) of 35,000 catalyst was 410,000 g polymer per 1 g of titanium.

In addition, it was found that this catalyst produced a homopolyethylene having a MI of 1.0 g/10 min. a MIR of 39 and a die swell of 41 g/20 cm by a single stage polymerization.

(3) Preparation of a catalyst for production of polyethylene (B).

(i) Preparation of solid catalyst component (c)

Solid catalyst component (c) was prepared and stored by repeating the preparation of solid component (c) described in Example 1—1 except for the following conditions. In this example, chromium trioxide in Example 1—1 was replaced by 25 g of monohydrate of chromium acetate (III), and the calcination temperature used in Example 1—1 was replaced by 600° C.

(ii) Preparation of organomagnesium component (d-1)

13.80 g of di-n-butylmagnesium, 2.85 g of triethylaluminum and 200 ml of n-heptane were introduced into a 500 ml flask, and the mixture was reacted at 80° C. under stirring for two hours to produce an organomagnesium complex corresponding to AlMg$_4$(C$_2$H$_5$)$_3$(n-C$_4$H$_9$)$_8$. The reacted solution was then cooled down to a temperature of 10° C. 50 ml of n-heptane solution containing 50 mmol of n-octanol was added dropwise to the cooled reaction solution to obtain a solution of organomagnesium complex containing alkoxy group.

It was found by gas chromatographic analysis that the complex had a composition corresponding to AlMg$_4$(C$_2$H$_5$)$_{2.70}$(n-C$_4$H$_9$)$_{6.28}$(On-C$_8$H$_{17}$)$_{2.02}$. The analysis was conducted by measuring the alcohol converted from all of the alkyl groups and alkoxy groups by hydrolysis of the oxydized product that had been obtained by oxidizing a part of the above complex solution with dried air.

(4) Production of polyethylene (B)

The polyethylene (B-1) was prepared using the polymerization vessel, the polymerization temperature, the polymerization pressure and the production rate as described in Example 1-1.

Into the polymerization vessel, the solid component (c) prepared in (3)-(i) of this example and organoaluminum component (d-1) were introduced in company with hexane which was fed at a rate of 40 1/hr. The feeding rate of the solid component (c) and the organoaluminum component (d-1) were adjusted to 2.92 g/hr. and 3 mmol/hr. The concentration of hydrogen was kept at 12 mol % and that of butene-1 1.5 mol %. The polyethylene (B-1) produced had a molecular weight of 150,000, a MIR of 95 and a density of 0.959 g/cm$^3$.

A homopolyethylene produced by a single stage polymerization using the same catalyst condition has a MI of 1.0 g/10 min., has a MIR of 61 and a die swell of 64 g/20 cm.

(5) Preparation of polyethylene composition

The polyethylenes (A), and (B-1) and (C), all in the form of powder, were mixed at a ratio of 38:35:27. To this mixture was added 500 ppm of n-octa-decyl-$\beta$-(4'-hydroxy-3', 5'-di-tert-butylphenyl) propionate and 200 ppm of tetrakis (2,4-di-tert-butylphenyl) 4,4'-biphenylenediphosphonite and 500 ppm of calcium stearate as anti-thermoxidizing agent. A polyethylene composition was produced employing the same conditions as described in Example 1—1 with respect to mixing, 88 and a density of 0.959 g/cm$^3$. For reference, a homopolyethylene having a MI of 1.0 g/10 min. prepared by using this catalyst has a MIR of 58 and a die swell of 61 g/20 cm.

(3) Preparation of polyethylene composition

The polyethylenes (A), and (C), which were prepared in Example 2-1, and the polyethylene (B-2) were compounded and pelletized in the same manner as described in Example 2-1 to produce a composition of which the properties are shown in Table 2.

Comparative Example 2-1

Employing the same catalyst as used in preparation of the polyethylenes (A) and (C) in Example 2-1, polyethylene (B-3) was produced. Polyethylene compositions were prepared in the same manner and conditions as described in Example 2-1 except that polyethylenes (A), (B-3) and (C) were used as polyethylene components. The properties of the polyethylene are shown in Table 2, which was prepared by the following polymerization.

Polyethylene (B-3) had a molecular weight of 160,000, a MIR of 43 and a density of 0.960 g/cm$^3$.

In the preparation of polyethylene, polymerization was carried out in the same manner as used in the preparation of polyethylenes (A) and (C) except that the concentration of hydrogen and that of butene-1 were about 32 mol % and about 0.3 mol % respectively.

TABLE 2

| | Component Polyethylene Being Mixed | | | | Properties of Polyethylene Compositions | | | | | | | |
|---|---|---|---|---|---|---|---|---|---|---|---|---|
| Item | MW$_C$/MW$_A$ | Parts by weight (A) | (B) | (C) | MI (g/10 min) | MIR | Density (g/cm$^3$) | Izod Impact Strength (Kg cm/cm) | Dropping Impact of Bottle (number of droppings) | ESCR of Bottle (hour) | Extrusion rate (g/min) | Die Swell (g/20 cm) | Irregularity Thickness of Bottle (rank) |
| Example 2-1 | 8 | 38 | (B-1) 35 | 27 | 0.41 | 86 | 0.949 | 16 | 10 | 80 | 255 | 44.5 | ⊚ |
| Example 2-2 | 8 | 38 | (B-2) 35 | 27 | 0.43 | 82 | 0.949 | 17 | 10 | 85 | 257 | 44.0 | ⊚ |
| Comparative Example 2-1 | 8 | 38 | (B-3) 35 | 27 | 0.40 | 63 | 0.949 | 17 | 3 | 70 | 240 | 37.5 | Δ | kneading, extrusion and so on. The properties of the composition are tabulated in Table 2.

Example 2—2

The solid catalyst component (c) as used in Example 2-1 and the organomagnesium component (d-2) prepared by the following method were combined.

(1) Preparation of organomagnesium component (d-2)

To a 500 ml flask, 13.80 g of di-n-butylmagnesium, 2.06 g of diethylzinc were charged together with 200 ml of n-heptane, and the mixture was reacted with stirring at a temperature of 80° C. for 2 hours to obtain a n-heptane solution of an organomagnesium complex corresponding to ZnMg$_6$(C$_2$H$_5$)$_2$(n-C$_4$H$_9$)$_{12}$.

(2) Preparation of polyethylene (B-2)

Into the same polymerization vessel as used in Example 1 were charged with the solid component (c) prepared in Example 2-1 at a rate of 2.48 g/hr. and the organomagnesium complex (d-2) at a rate of 2.6 mmol/hr. as catalyst together with hexane at 40 1/hr. The polymerization temperature, and pressure and production rate were the same as in Example 1—1. Polymerization was conducted in the presence of hydrogen at a concentration of about 15 mol % and butene-1 at a concentration of about 1.5 mol %. The product polyethylene had a molecular weight of 140,000, a MIR of

EXAMPLE 3

(1) Preparation of polyethylene (A) and (C)

In this example, a polyethylene (A) and a polyethylene (C) were prepared in the same manner as used in Example 2-1 with respect to the conditions of polymerization, vessel, polymerization temperature, polymerization pressure and production rate. The catalyst was the same as described in the preparation of the polyethylene (A) and the polyethylene (C) in Example 1—1.

In the preparation of polyethylene (A) of this example, hydrogen concentration in the polymerization system was adjusted so as to produce a plyethylene having a molecular weight of 12,000. In the preparation of polyethylene (C) of this example, hydrogen concentration and octene-1 concentration were adjusted so as to produce a polyethylene having a molecular weight of 700,000 and a density of 0.942 g/cm$^3$. Hydrogen concentrations in the polymerization system were about 88 mol % for the preparation of polyethylene (A) and about 3 mol % for the preparation of polyethylene (C). In the case of the preparation of polyethylene (C), the concentration of octene-1 was kept about 3 mol %.

(2) Preparation of polyethylene (B)

Polyethylene (B) having a molecular weight of 250,000 of this example was prepared by employing the catalyst used in preparation of the polyethylene (B) in Example 1—1 in the same manner as described in Example 1—1 except that a hydrogen concentration of 1 mol % was used.

(3) Preparation of polyethylene composition

The polyethylenes (A), (B), and (C) all of which were prepared in this example, were mixed at the ratio as tabulated in Table 3 and processed in the same manner as described in Example 1—1 to produce a polyethylene composition. The properties of the polyethylene compositions are shown in Table 3.

Comparative Example 3

Except that polyethylene (A) and (C) both of which were prepared in Example 3, were mixed at a ratio given in Table 3, a polyethylene composition consisting of polyethylenes (A) and (C) was produced by blending and kneading in the same manner and conditions as used in Example 1.

The properties of the polyethylene composition are shown in Table 3.

11 kg/cm$^2$G, respectively. Polymerization was controlled so as to produce a polymer at a rate of 10.5 kg/hr.

The solid catalyst component (C) prepared in (2) was charged at a rate of 3.1 g/hr. together with purified grade hexane which was fed at a rate of 40 l/hr. into the polymerization vessel.

Hydrogen was used as a molecular weight regulator. In the gaseous phase, the concentration of hydrogen was kept at about 30 mol % and that of butene-1 was 0.6 mol %.

The polyethylene (B) thus produced had a molecular weight of 100,000 and a density of 0.964 g/cm$^3$. On the other hand, a homopolyethylene having a MI of 1.0 g/10 min., which was obtained under use of this catalyst, had a MIR of 70 and a die swell of 49 g/20 cm.

(4) Preparation of polyethylene composition

The polyethylenes (A), (C) and (B), all of which were produced in this example were mixed at a ratio as shown in Table 4. To this mixture, 300 ppm of tetrakis[-methylene-3-(3',5'-di-t-butyl-4'hydroxyphenyl) proprionate] methane and 300 ppm of di-lauryl 3,3'-thiodipropionic acid ester as antioxidants were added, and the

TABLE 3

| | | | | | Properties of Polyethylene Compositions | | | | | | | |
|---|---|---|---|---|---|---|---|---|---|---|---|---|
| | Component Polyethylene Being Mixed | | | | MI | | | Dropping Impact of Bottle | ESCR of Bottle | Extrusion rate | Die Swell | Irregularity Thickness |
| Item | MW$_C$/ MW$_A$ | Parts by weight | | | (g/10 min) | MIR | Density (g/cm$^3$) | Izod Impact Strength (Kg cm/cm) | (number of droppings) | (hour) | (g/min) | (g/20 cm) | of Bottle (rank) |
| | | (A) | (B) | (C) | | | | | | | | | |
| Example 3 | 58 | 25 | 45 | 30 | 0.03 | 220 | 0.956 | more than 60 | more than 15 | more than 250 | 221 | 47.3 | ◉ |
| Comparative | 58 | 25 | 0 | 30 | 0.03 | 250 | 0.951 | 35 | —* | —* | 205 | 32.1 | —* |

*Molding of bottle was failed. Incomplete welding of pinch-off portion of the handle occurred in the molded bottle.

Example 4–1

(1) Polyethylene (A) and polyethylene (C)

The polyethylene produced by the two stage polymerization in Example 1—1 was used for the component of polyethylene (A) and polyethylene (C).

(2) Preparation of catalyst for production of polyethylene (B).

10 g of chromium trioxide was dissolved in 2,000 ml of distilled water. 500 g of commercial silica (Grade 952 manufactured by Fuji Davison Company) was immersed in the chromium trioxide solution and the mixture was stirred at room temperature for an hour. Then, the obtained slurry was heated until the water thereof was removed by evaporation. After the removal of water was completed, the solid residue was dried at 120° C. under a reduced pressure for ten hours. The dried solid was then calcined at 800° C. under a stream of dried air for 5 hours to obtain a solid catalyst component (C). The solid catalyst component (C) was found to contain 1% by weight of chromium and stored in a nitrogen atmosphere at room temperature.

(3) Preparation of polyethylene (B)

A polyethylene (B) was produced by a single stage polymerization process in a polymerization vessel having a capacity of 200 liters. The polymerization temperature and the polymerization pressure were 86° C. and mixture was thoroughly mixed by agitation. The thus obtained mixture was kneaded at a temperature of 220° C. by means of a FCM machine manufactured by Farrel Co. The kneaded product was pelletized by extruding at a temperature of 250° C. using a single screw type extruder. The pelletized polyethylene composition was extremely excellent in both processability and physical properties as seen in Table 4.

Example 4–2

Polyethylenes (A), (C) and (B), all of which were produced in the preceding example, were mixed in the compounding parts as shown in Table 4. A polyethylene composition was produced in the same manner and conditions as in Example 1—1 with respect to the additives, mixing, kneading, extrusion, and the like. The properties of the polyethylene composition are also shown in Table 4.

Comparative Example 4–1 ~ 4—4

Polyethylenes (A), (C) and (B), all of which were produced in Example 4–1, were mixed in the parts given in Table 4, in the same manner as in Example 4–1 with respect to the additives, conditions of mixing, kneading, extrusion, and the like. The properties of the polyethylene compositions were evaluated and the results are shown in Table 4.

TABLE 4

| Item | Component Polyethylene Being Mixed | | | | Properties of Polyethylene Compositions | | | | | | | |
|---|---|---|---|---|---|---|---|---|---|---|---|---|
| | $MW_C/MW_A$ | Parts by weight | | | MI (g/10 min) | MIR | Density (g/cm³) | Izod Impact Strength (Kg cm/cm) | Dropping Impact of Bottle (number of droppings) | ESCR of Bottle (hour) | Extrusion rate (g/min) | Die Swell (g/20 cm) | Irregularity Thickness of Bottle (rank) |
| | | (A) | (B) | (C) | | | | | | | | | |
| Example 4-1 | 41.5 | 36.8 | 25 | 38.3 | 0.17 | 182 | 0.958 | 18 | 5 | 85 | 232 | 39.8 | ◎ |
| Example 4-2 | 41.5 | 24.5 | 50 | 25.5 | 0.27 | 152 | 0.960 | 20 | 8 | 70 | 242 | 42.5 | ◎ |
| Comparative Example 4-1 | 41.5 | 46.6 | 5 | 48.5 | 0.12 | 210 | 0.956 | 14 | 1 | 36* | 219 | 35.1 | x |
| Comparative Example 4-2 | 41.5 | 7.4 | 85 | 7.7 | 0.54 | 92 | 0.963 | 21 | 5 | 11 | 244 | 46.8 | ◎ |
| Comparative Example 4-3 | 41.5 | 49.0 | 0 | 51 | 0.11 | 218 | 0.956 | 14 | 1 | 25* | 218 | 34.8 | x |
| Comparative Example 4-4 | 0 | 0 | 100 | 0 | 0.81 | 68 | 0.964 | 23 | 5 | 4 | 249 | 48.8 | ◎ |

*Cracks occurred near the welded pinch-off portion of the handle. In other, cracks occurred at the bottom of bottle.

Example 5

(1) The polyethylene consisting of polyethylenes (A) and (C) as prepared by the two stage polymerization in example 1—1 was used as polyethylenes (A) and (C).

(2) Preparation of polyethylene (B)

Except that $Al(C_2H_5)_2(OC_2H_5)$ was used as an organometallic component (d) of catalyst, a polyethylene (B) was produced by polymerizing ethylene at the conditions as used in the preparation of the polyethylene (B) in example 1—1. The polyethylene (B) obtained had a molecular weight of about 110,000, a MIR of 60 and a density of 0.967 g/cm³.

For reference, the homopolymer of ethylene which have a MI of 1.0 g/10 min., produced by a single stage polymerization, have a MIR of 73, a die swell of 59 g/20 cm.

(3) Preparation of polyethylene composition

A polyethylene composition was made from the materials set forth above in proportions indicated in Table 5.

The conditions and manners of compounding were the same as in Example 1-1 with respect to the additives, conditions of mixing, kneading, extrusion and the like.

The properties of the polyethylene composition were deter mined and shown in Table 5.

TABLE 5

| Item | Component Polyethylene Being Mixed | | | | Properties of Polyethylene Compositions | | | | | | | |
|---|---|---|---|---|---|---|---|---|---|---|---|---|
| | $MW_C/MW_A$ | Parts by weight | | | MI (g/10 min) | MIR | Density (g/cm³) | Izod Impact Strength (Kg cm/cm) | Dropping Impact of Bottle (number of droppings) | ESCR of Bottle (hour) | Extrusion rate (g/min) | Die Swell (g/20 cm) | Irregularity Thickness of Bottle (rank) |
| | | (A) | (B) | (C) | | | | | | | | | |
| Example 5 | 41.5 | 22.5 | 54 | 23.5 | 0.23 | 143 | 0.960 | 24 | 14 | 68 | 247 | 47.9 | |

It is understood that the specification and examples are illustrative but not limitative of the present invention and that other embodiments within the spirit and scope of the invention will suggest themselves to those skilled in the art.

What we claim is:

1. A polyethylene composition comprising three types of polyethylene (A), (B) and (C) selected from the group consisting of homopolymers of ehtylene and copolymers of ethylene and an α-olefin, wherein
(i) the polyethylene (A) has a molecular weight of from 5,000 to 90,000, the polyethylene (C) having a molecular weight of from 100,000 to 1,500,000 and the ratio of the molecular weight of the polyethylene (C)/ the molecular weight of the polyethylene (A) being between 4 and 200, and the polyethylene (A) and the polyethylene (C) are produced by a polymerization using a magnesium-containing Ziegler type catalyst,
(ii) the polyethylene (B) has a molecular weight of from 50,000 to 500,000 produced by a polymerization using a chromium compound supported type catalyst capable of producing a homopolymer of ethylene in a single stage polymerization having a flow ratio of from 40 to 150 and a die swell of from 40 to 100 g/20 cm measured at the condition in which the said homopolymer exhibits a melt index of 1 g/10 min.,
(iii) the ratio of the polyethylene (A) and the polyethylene (C) by weight is from 70 to 30 to 30 to 70, and the amount of the polyethylene (B) in the composition ranges from 10% by weight to 75% by weight, and
(iv) the melt index of the composition is not less than 0.001 g/10 min., and not more than 10 g/100 min.

2. A polyethylene composition according to claim 1, wherein the polyethylene (A) and the polyethylene (C) are prepared by a two stage polymerization.

3. A polyethylene composition according to claim 1, wherein the polyethylene (B) is produced by polymerization using a chromium compound supported type catalyst combined with an organometallic compound capable of producing a homopolymer of ethylene in a single stage polymerization having a flow ratio of from 50 to 120 and a die swell of from 50 g/20 cm to 80 g/20 cm measured at the condition in which the said polyethylene exhibits a melt index of 1 g/10 min.

4. A polyethylene composition according to claim 1, wherein the molecular weight of the polyethylene (B) is within a range from 70,000 to 400,000 and the ratio of the molecular weight of polyethylene (B)/the molecular weight of the polyethylene (A) is 1.2 or more, the ratio of the molecular weight of the polyethylene (B)/ the molecular weight of polyethylene (C) is 0.9 or less, and the molecular weight of the polyethylene consisting of the polyethylene (A) and the polyethylene (C) is higher than that of the polyethylene (B).

5. A polyethylene composition according to claim 1, wherein the polyethylene (A) has a molecular weight of from 10,000 to 70,000 and the polyethylene (C) has a molecular weight of from 200,000 to 1,000,000 produced by polymerization using a magnesium containing Ziegler type catalyst which is capable of producing a homopolymer of ethylene in a single stage polymerization having a flow ratio of 20 to less than 50 and a die swell of 20 g/20 cm to less than 50 g/20 cm measured at the condition in which the said homopolymer exhibits a melt index of 1 g/10 min.

6. A polyethylene composition according to claim 1, wherein the density of the polyethylene composition is in a range of from 0.935 g/cm$^3$ to 0.965 g/cm$^3$.

7. A polyethylene composition according to claim 1, wherein the polyethylene (A) has a molecular weight of from 10,000 to 70,000 and the polyethylene (C) has a molecular weight of from 200,000 to 1,000,000 which are produced by a polymerization using a magnesium-containing Ziegler type catalyst which is capable of producing a homopolymer of ehtylene in a single stage polymerization having a flow ratio of from 20 to less than 50 and a die swell of from 20 g/20 cm to less than 50 g/20 cm measured at the condition in which the said homopolymer exhibits a melt index of 1 g/10 min. the polyethylene (B) is produced by a polymerization using a chromium compound supported type catalyst combined with an organometallic compound which is capable of producing in a single stage polymerization a homopolymer of ethylene having a flow ratio of from 50 to 120 and a die swell of from 20 g/20 cm to 80 g/20 measured at the condition in which the said homopolymer exhibits a melt index of l/g/10 min. and the amount of the polyethylene lene (B) in the composition ranges from 15% by weight to 60% by weight.

8. A polyethylene composition according to claim 7, wherein the density of the polyethylene composition is in a range of from 0.935 g/cm$^3$ to 0.965 g/cm$^3$.

* * * * *

UNITED STATES PATENT AND TRADEMARK OFFICE
CERTIFICATE OF CORRECTION

PATENT NO. : 4,536,550  Page 1 of 2

DATED : August 20, 1985

INVENTOR(S) : Kisoo Moriguchi, et al.

It is certified that error appears in the above-identified patent and that said Letters Patent is hereby corrected as shown below:

| | |
|---|---|
| Col. 6, line 8 | Delete "cmzG" and substitute $--cm^2G--$ |
| Col. 8, line 5 | Delete "($\alpha 30\beta$) and substitute $--(\alpha + \beta)--$ |
| Col. 9, line 8 | Delete "1" and substitute $--\ell--$ |
| Col. 9, line 9 | Delete "1" and substitute $--\ell--$, second instance |
| Col. 9, line 68 | After "cm" insert $--^3--$ |
| Col. 12, line 12 | Before "indicates" delete "(⊙)" and substitute -- (O) -- |
| Col. 12, line 20 | Delete "(HSiC$_3$)" and substitute --(HSiCl$_3$)-- |
| Col. 13, line 67 | Before period delete "9.5" and substitute $--0.5--$ |
| Col. 15, lines 10, 11 | Correct spelling of "polyethylene" |
| Col. 15, line 28, Table 1 | Last line under "Item" insert --Example 1-4-- |
| Col. 16, line 20, Table 1 | Second line under last column heading delete "⊙" and substitute -- O -- |
| Col. 16, line 27 | Line 6 under 11th column heading, after "25" insert -- * -- |
| Col. 17, line 11 | After "hr." insert --respectively-- |
| Col. 19, line 37, Table 3 | Last line under "Item" insert --Example 3-- |
| Col. 21, line 24 | After "A" delete "1" and substitute $--\ell--$ |

UNITED STATES PATENT AND TRADEMARK OFFICE
CERTIFICATE OF CORRECTION

PATENT NO. : 4,536,550　　　　　　　　　　　　　Page 2 of 2
DATED : August 20, 1985
INVENTOR(S) : Kisoo Moriguchi, et al.

It is certified that error appears in the above-identified patent and that said Letters Patent is hereby corrected as shown below:

| | |
|---|---|
| Col. 22, line 9, Table 4 | First line under last column heading delete "◎" and substitute -- ○ -- |
| Col. 22, line 50, Table 5 | Under last column heading insert -- ◎ -- |
| Col. 21, line 62 and Col. 24, line 1 | Correct spelling of "ethylene" |

Signed and Sealed this

Thirteenth Day of May 1986

[SEAL]

Attest:

DONALD J. QUIGG

Attesting Officer　　　Commissioner of Patents and Trademarks